Oct. 19, 1937.  D. B. PERRY  2,096,061
DRIVE CHAIN
Filed May 26, 1936  2 Sheets-Sheet 1
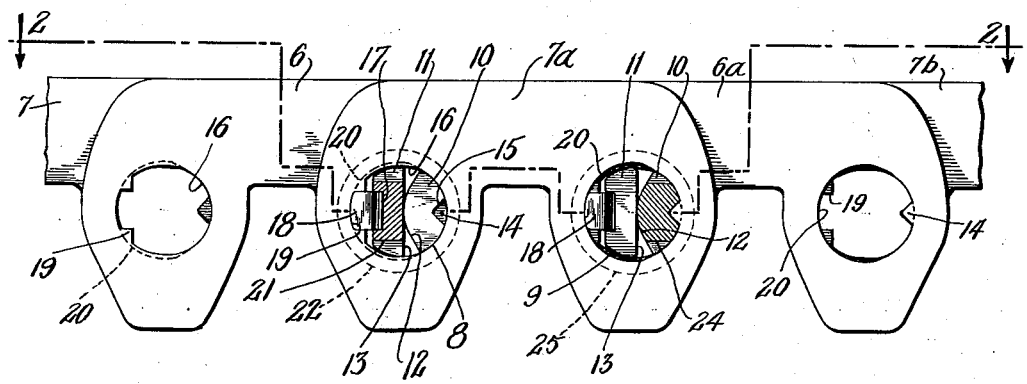
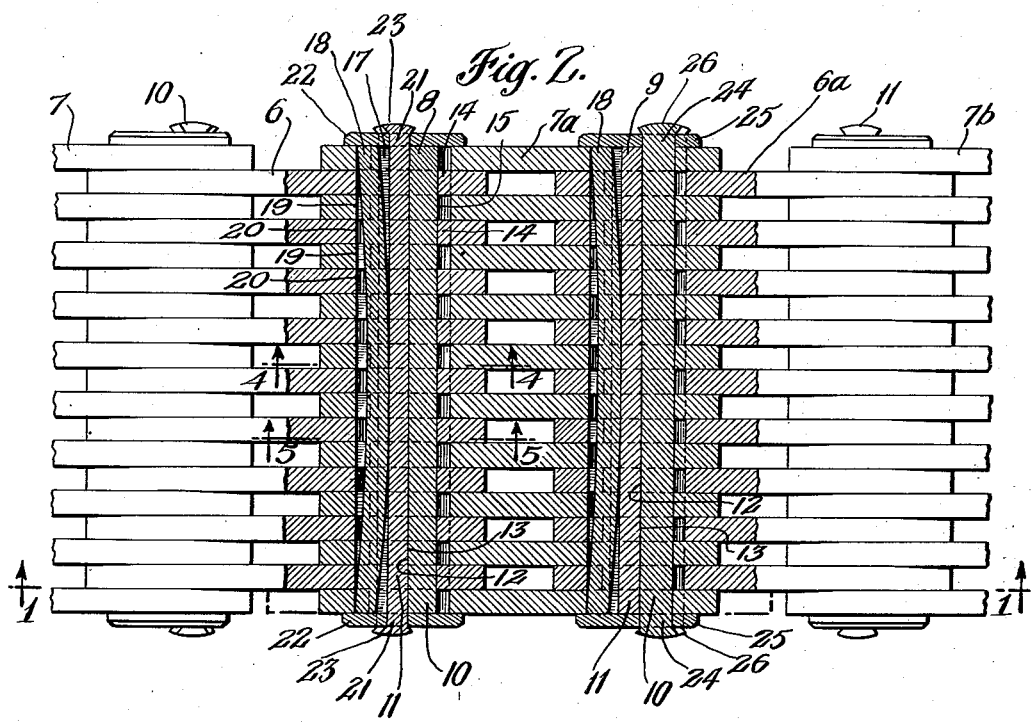
INVENTOR
David Barnes Perry
BY
Synnestvedt & Lechner
ATTORNEYS Oct. 19, 1937.    D. B. PERRY    2,096,061
DRIVE CHAIN
Filed May 26, 1936    2 Sheets-Sheet 2

INVENTOR
David Barnes Perry
BY
Synnestvedt & Lechner
ATTORNEYS

Patented Oct. 19, 1937

2,096,061

UNITED STATES PATENT OFFICE 2,096,061

DRIVE CHAIN

David Barnes Perry, Ithaca, N. Y., assignor to Morse Chain Company, Ithaca, N. Y., a corporation of New York Application May 26, 1936, Serial No. 81,789

8 Claims. (Cl. 74—253)

This invention relates to drive chains and has for its primary object the provision of an improved rocker joint for such chains of a character providing elasticity in the chain.

Another object of my invention is the provision of an elastic joint construction for drive chains employing pintles of the rocker type operating to normally shorten the pitch of the chain within limits.

A further object resides in the provision of a rocker joint for drive chains having spring means associated therewith to make the joint yieldable and in which the spring means is so arranged that it does not constitute part of the rocker bearing of the joint.

How the foregoing, together with such other objects and advantages as may hereinafter appear or are incident to my invention are realized, is illustrated in preferred form in the accompanying drawings, wherein—

Figure 1 is a sectional side elevation of a portion of a drive chain embodying my invention with the pintles omitted in the two end apertures, the view being taken substantially on the line 1—1 of Figure 2;

Figure 2 is a plan section taken substantially on the line 2—2 of Figure 1;

Figure 3:
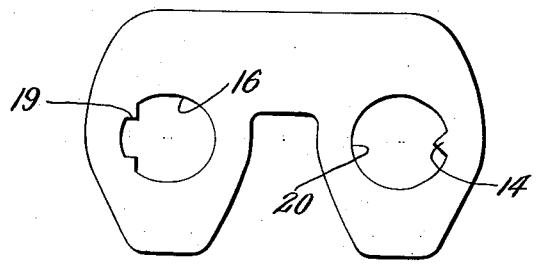
Figure 3 is a face view of a link plate.

The section of the drive chain illustrated comprises links 6, 6a, 7, 7a and 7b each composed of a plurality of arch-shaped plates having tooth portions for engaging the teeth of sprocket wheels and two part pintles of the rocker type joining the links, two of the joints being indicated as a whole by the reference numerals 8 and 9 in Figures 1 and 2.

These two part pintles each comprise a rocker pin 10 and a seat pin 11. The rocker pin 10 is provided with a rocker surface 12 adapted to rock on the seating surface 13 of the seat pin. This seating surface 13 may be flat as shown or it may be convex or concave as desired. I prefer to so arrange the two part pintles in the apertures of the links that all of the seat pins 11 face in the same direction as illustrated in Figure 1, although the advantages to be obtained through my invention may also be realized if the seat pins are alternately faced in opposite directions.

In the arrangement illustrated the rocker pin 10 of the joint 8 is keyed in the plates of the adjacent link 6 so as to rotate therewith when articulation takes place at this joint and has turning clearance in the plates of the connected link 7a. This rocker pin 10 is keyed in the plates of the link 6 by means of keying surfaces or projections 14 in the plate apertures fitting a longitudinally extending groove 15 in the pin, the contour of the apertures being like the right-hand aperture of Figure 3. Turning clearance is provided in the apertures of the plates of the connected link 7a because of their curved surfaces 16, the contour of these apertures being like the left-hand aperture of Figure 3.

Figure 4:
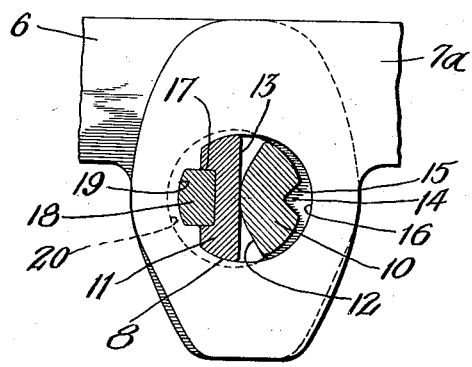
Figure 4 is an enlarged fragmentary sectional elevation taken on the line 4—4 of Figure 2 with the chain under load.
Figure 5:
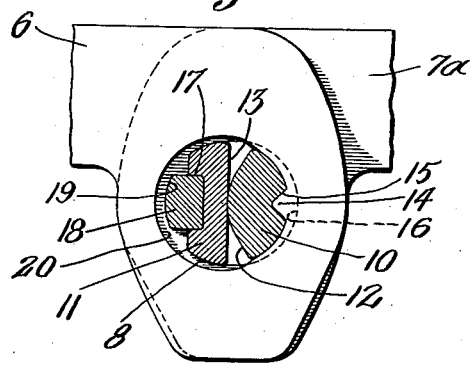
Figure 5 is a view similar to Figure 4 taken on the line 5—5 of Figure 2.

The associated seat pin 11 of the joint 8 is arranged so that its front seating surface 13 engages the rocker surface 12 of the rocker pin and is provided with a longitudinally extending recess 17 in its rear surface. A yieldable or bowed spring member 18 is carried in this recess, the thickness of which is greater than the depth of the recess so that it projects from the seat pin as clearly shown in Figures 4 and 5. The projecting portion of the member 18 fits into keying surfaces or notches 19 provided in the apertures of the plates of the connected link 7a so that the member 18 and the seat pin 11 are keyed in this connected link to turn therewith. The contour of these apertures is like the left-hand aperture in Figure 3. The member 18 and seat pin 11 having turning clearance in the apertures of the plates of the link 6 by reason of the curved surfaces 20 of these apertures which are of the contour of the right-hand aperture in Figure 3. The seat pin 11 of the joint 8 is provided with shouldered end portions 21, shown in cross-section in Figure 1, which fit similarly shaped holes in end washers 22. These end portions are riveted over as indicated at 23 after the chain parts are assembled.

Referring now to the other joint 9 illustrated in Figures 1 and 2, the rocker pin 10 in this instance is keyed in the link 7a and the seat pin 11 is keyed in the link 6a. These pins are of the same shape in cross-section as the pins above described, and the right-hand aperture of the link 7a is the same as the right-hand aperture of the link 6, and the left-hand aperture of the link 6a is the same as the left-hand aperture of the link 7a. The construction and arrangement of the spring member 18 of this joint is the same as that of the joint 8 above described. In this instance, the rocker pin 10 is provided with shouldered end portions 24, shown in cross-section in Figure 1, which fit correspondingly shaped holes in the end washers 25, and the end portions are riveted over as indicated at 26. If desired, however, the seat pin 11 of this joint may be shouldered and riveted in place instead of the rocker pin.

The remaining links and joints of the chain are of the same arrangement as above, it being pointed out that the joint for the links 6 and 7 is like the joints 9 and that the joint for the links 6a and 7b is like the joint 8, i. e., joints of the construction of the joint 8 alternate with joints of the construction of the joint 9 throughout the length of the chain.

It will be seen from the foregoing that I have provided an elastic rocker joint drive chain in which the spring members are so arranged that they do not constitute a working portion of the rocker joint bearing, i. e., the arrangement is such that the rocker pin and seat pin are in bearing contact with each other from end to end under all load conditions because the spring member is associated with one of the pins of the two part pintle, in this instance the seat pin, at its rear or non-bearing face.

In the particular arrangement illustrated in the drawings in which all of the seat pins face in the same direction, all of the link plates are of the same form, i. e., each link plate has an aperture at one end for keying the rocker pin thereto and an aperture at the other end for keying the seat pin thereto. In instances where the direction in which the seat pins face alternates throughout the length of the chain, every other link is provided with two apertures like the right-hand apertures of Figure 3 adapted to key the rocker pins in place and the remaining or connecting links are provided with two apertures like the left-hand apertures of Figure 3 adapted to key the seat pins in place. The construction of the pintle parts and the spring member, however, is the same as described in connection with the preferred form of my invention.

Through the practice of my invention a drive chain is provided in which elongation of pitch is automatically compensated for in the slack run of the chain because the spring action or tensioning of the joints effects a shortening of pitch in the slack run, and thus objectionable whip is eliminated. This automatic compensation feature is very advantageous in installations where it is difficult to adjust center distances to take care of elongation due to wear.

I claim:

1. A drive chain comprising, in combination, a series of links, rocker joints for pairs of said links comprising a rocker pin having a keying surface and a rocker surface, said keying surface being adapted to key said pin to one of the links of a pair, and a seat pin having a keying surface and a seating surface on which the rocker pin rocks, said last mentioned keying surface being adapted to key said seat pin to the other link of said pair, and a yieldable member located between the keying surface of one of said pins and the links for tensioning the joints.

2. A drive chain comprising, in combination, a series of links, rocker joints for pairs of said links comprising a rocker pin having a keying surface and a rocker surface, said keying surface being adapted to key said pin to one of the links of a pair, and a seat pin having a keying surface and a seating surface on which the rocker pin rocks, said last mentioned keying surface being adapted to key said seat pin to the other link of said pair, and a yieldable member located between the keying surface of said seat pin and the links for tensioning the joints.

3. A drive chain comprising, in combination, a series of links, rocker joints for pairs of said links comprising a rocker pin having a keying surface and a rocker surface, said keying surface being adapted to key said pin to one of the links of a pair, and a seat pin having a keying surface and a seating surface on which the rocker pin rocks, said last mentioned keying surface being adapted to key said seat pin to the other link of said pair, and a yieldable member located between the keying surface of one of said pins and the links for tensioning the joints, said last mentioned pin being recessed at said keying surface to receive said yieldable member.

4. A drive chain comprising, in combination, a series of links, rocker joints for pairs of said links comprising a rocker pin having a keying surface and a rocker surface, said keying surface being adapted to key said pin to one of the links of a pair, and a seat pin having a keying surface and a seating surface on which the rocker pin rocks, said last mentioned keying surface being adapted to key said seat pin to the other link of said pair, said seat and rocker pins being non-yieldable, and a yieldable member located between the keying surface of one of said pins and the links for tensioning the joints.

5. A drive chain comprising, in combination, a series of links having pintle receiving apertures, two part pintles in said apertures comprising a seat pin and a rocker pin; and a yieldable member located between one of said pintle parts and adjacent aperture wall surface, said last mentioned pintle part being recessed to receive said yieldable member.

6. A drive chain comprising, in combination, a series of links; rocker joints for pairs of said links comprising a rocker pin keyed in one link of a pair and having a rocker surface, and a seat pin keyed in the other link of said pair and having a front seating surface cooperating with the rocker surface of the seat pin, said seat pin having a rear surface provided with a longitudinally extending recess; and a yieldable member carried in said recess and engaging the link in which the seat pin is keyed.

7. In a drive chain, the combination of links having pintle receiving apertures, two part pintles in said apertures pivotally joining pairs of the links comprising a rocker pin keyed in one link and a seat pin adapted to be keyed in the other link, said pin having rocker and seating surfaces respectively constituting the working portion of a rocker joint, said seat pin having recess extending longitudinally thereof, and a bowed spring member in said recess engaging the link in which the seat pin is keyed for tensioning the joint.

8. In a drive chain, the combination of links having apertures therein; and a rocker joint for pairs of said links comprising a rocker pin keyed in the aperture of one link to rotate therewith and a seat pin having turning movement in said aperture, said seat pin having a longitudinally extending recess; and a bowed spring member seated in said recess to rotate with the seat pin, said spring member being keyed in the aperture of the other link to rotate therewith and having turning clearance in the aperture of the link in which the rocker pin is keyed.

DAVID B. PERRY.